July 11, 1939.　　　W. BUSCHBECK　　　2,165,836
MODULATION METER
Filed July 24, 1936
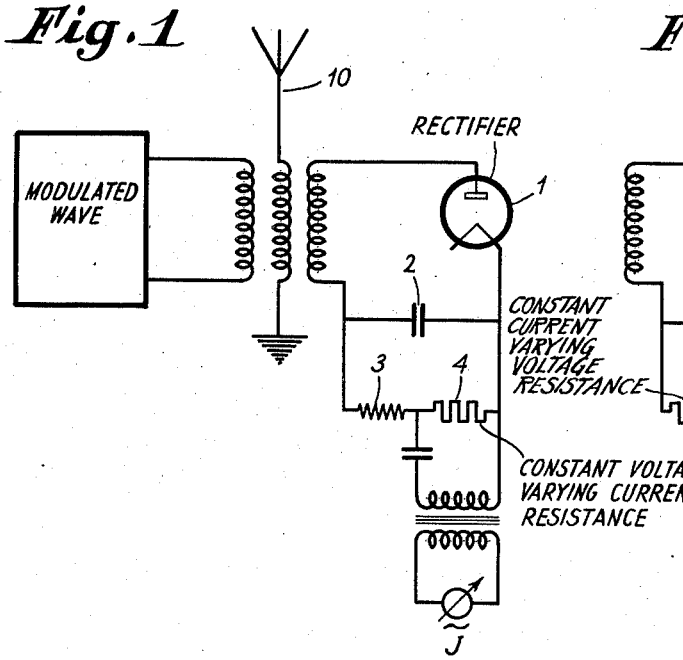
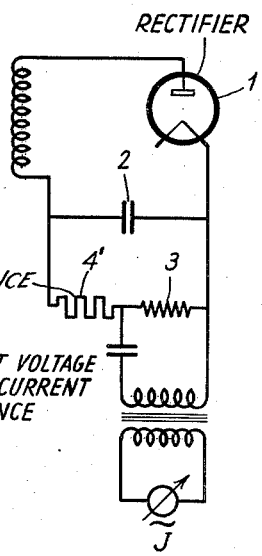
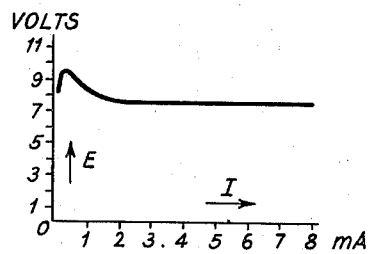
INVENTOR
WERNER BUSCHBECK,
BY
ATTORNEY Patented July 11, 1939

2,165,836

UNITED STATES PATENT OFFICE 2,165,836

MODULATION METER

Werner Buschbeck, Berlin, Germany, assignor to Telefunken Gesellschaft für Drahtlose Telegraphie m. b. H., Berlin, Germany, a corporation of Germany Application July 24, 1936, Serial No. 92,304
In Germany August 14, 1935

8 Claims. (Cl. 179—171)

Hitherto difficulties have been encountered in manufacturing a control meter, to be used with modulated transmitters arranged to cover a wide wave range or to use different power stages, in other words for transmitters having variable amplitude currents, which does not require adjustment. As is known, the degree of modulation is defined by the ratio between the low frequency alternating voltage amplitude attained at an ohmic resistor following linear detection, and the drop of the direct voltage corresponding to the carrier wave amplitude or intensity. In the ordinary control meter circuits the low frequency measuring instrument is ordinarily gauged in percent of degree of modulation, but this calibration can only be correct for a definite direct current intensity, in other words for high frequency current of a definite amplitude at a given coupling between the meter and the high frequency circuit. If the high frequency current amplitude changes (or the coupling) at changing of the wave to be monitored, or in case a different number of or type of power stages are used, the coupling of the detector to the transmitter must be subsequently adjusted.

To avoid this difficulty, circuits have been proposed already and have been constructed which in fact permit the measurement of the degree of modulation, i. e., the ratio between the low frequency and the direct current component following detection over a range of frequencies and amplitude. In this connection, reference is made, for instance, to the cross coil instruments with variable air gap which afford a direct indication of the modulation ratio. Such instruments are expensive and cumbersome, because these cross coil instruments are comparatively sensitive, and furthermore because the low frequency component requires an additional detection.

In this application, a control meter will be described which while using ordinary instruments permits direct calibration in percent of degree of modulation, despite variable input voltages at the detector which vary by a ratio of 1:5. To accomplish this object in accordance with the invention, self controlling resistors maintaining the voltage or current constant of the type known as iron hydrogen or dioxide of uranium resistors, are employed.

In describing my invention reference will be made to the attached drawing wherein Figures 1 and 3 show two embodiments of my meter, while Figure 2 is a curve showing the current voltage characteristic of an impedance used in the circuits of Figures 1 and 3.

An example of an embodiment of the idea of the invention is shown in Figure 1. The antenna 10 or the intermediate circuit of a modulated transmitter has a detector 1 coupled thereto. The condenser 2 is a short circuit with respect to the high frequency wave energy, but 2 is of extremely high impedance with respect to the demodulated low frequency. Then at the combined resistors 3 and 4 there appears a direct current potential corresponding to the amplitude of the carrier wave of the transmitter as well as the low frequency alternating potential corresponding to the degree of modulation. If for instance the resistor 3 is an ordinary resistor the value of which is independent of the current amplitude and intensity, while the resistor 4 is a hot conductor with a characteristic as shown for instance in Figure 2, namely such that the voltage across the resistor 4 is practically independent of the value of the direct current within the control limits of the hot conductor, in other words, independent of the high frequency current of the modulated transmitter. Since the hot conductor 4, owing to its heat capacity has a building up period of several seconds up to approximately ½ minute (according to type), no resistance variation takes place at the rhythm of the demodulated low frequency, accordingly, no component characteristic of said low frequency can be derived from the resistor 4 in a known manner and applied to an instrument for mean value or peak value.

The manner of operation of the disclosed device is based upon the fact that the rectified high frequency oscillation to be investigated is led to an ordinary resistance and to a resistance of the constant voltage varying current type which are connected in series. Resistors 3 and 4 are so connected in Figure 1. The non-linear resistance 4 is of a material such that the direct component of the voltage occurring in it remains constant when the voltage across the terminals of the whole series connection is slowly varied. This is due to the fact that on a variation of the total voltage applied to the series connection, the ratio of the voltage division between resistances 3 and 4 is altered, and this occurs in such a way that on increasing the total voltage the resistance of current dependent resistance 4 is decreasing so that the partial voltage thereat remains constant. Now, if at the terminals of the series connection a direct voltage superposed by alternating voltage (rectified carrier and modulation oscillation) is applied, then the resistance of the current dependent resistance due to its inertia, does not vary in accordance with the alternating current. This alternating current can be taken from the resistance 4 and appears in the meter. The magnitude of the current dependent resistance, on the contrary, depends only on the magnitude of the direct voltage. If, therefore, the direct voltage be increased the alternating voltage remaining constant (small degree of modulation) the resistance of the current dependent resistance 4 will decrease. That is to say, the amplitude of alternating voltage taken off the current dependent resistance will also become smaller, which is directly corresponding to the degree of modulation. If the direct voltage and simultaneously the alternating voltage (constant degree of modulation) be increased, the resistance of current dependent resistance 4 will decrease, the alternating voltage taken from 4 will remain constant, however, as the alternating voltage applied is just as much bigger as the current dependent resistance has decreased.

In the final case possible, that the direct current decreases while the alternating current remains constant (high degree of modulation) the magnitude of the resistance of current dependent resistance 4 will increase so that the alternating voltage taken from 4 is big corresponding to the degree of modulation. It is to be seen, therefore, that the alternating voltage taken off the current dependent resistance is really in direct proportion to the degree of modulation, and this proportion is independent of the absolute value of the carrier oscillation and, therefore, independent of the degree of coupling between the measuring circuit and the circuit to be measured. In other words, for a given signal the ratio of the alternating voltage across 4 to the direct voltage across 4 remains the same for all couplings between 10 and 1.

Strictly speaking, the indication would only be absolutely correct if the control resistor would be passed by direct current only, and not by direct current and low frequency current together as in the arrangement shown. However, in practice this condition is immaterial. It was found from oscillographic records of transmitters modulated by speech or music, that at maximum degree of modulation such as 90% and more, the average degree of modulation does not exceed the value of 25 to 30%, since the high modulation peaks last only a very short time as known by experience. Owing to its large heat inertia, the hot conductor integrates the varying current pulses over a longer time period, so that the effective current can actually be calculated from the average degree of modulation. It is known that $$J_{eff} = J_{Tr}\sqrt{1 + \frac{K^2}{2}}$$

wherein $J_{Tr}$ is the amplitude of the carrier wave, and $K$ the degree of modulation. At an average modulation of 28% therefore, there is:

$$\frac{J_{eff}}{J_{Tr}} = 1.04$$

This deviation of 4% lies almost within the accuracy of the measurement thus being immaterial, or can be taken into consideration at the calibration.

In like manner as in the case of the constant voltage varying current resistance, the modulation meter may also be equipped with resistors of the iron hydrogen type. In this case the current in the resistance is maintained constant. Thus corresponding to the reference characters of Figure 1, item 3 is to be replaced by the iron hydrogen resistor of the constant current type, and item 4 is to be replaced by an ordinary resistor. Otherwise the same considerations are true as stated above. This modification is shown in Figure 3 of the drawing.

When instead of constant voltage varying current resistances, varying voltage constant current resistances are used, the taking off of the measuring alternating current has to take place at the normal resistance 3 as shown in Figure 3. The constant current varying voltage resistance 4' is in series with resistance 3, as in the arrangement of Figure 1. In other respects, however, the manner of operation is exactly the same as described hereinbefore.

If very large current variations are to be expected in the coupling circuit such as for instance at power control within wide limits, it will be advisable to adapt to a certain extent the working condition of the high frequency detector to the varied operating conditions in order to remain within the control range of the self controlling resistors. This may be accomplished for instance in that in common with the operating organ for the power control there is also varied in a continuous fashion or in steps the coupling of the detector or the constant resistor connected in series to the self controlling resistor.

I claim:

1. In a system for direct indication of the degree of modulation of modulated high frequency current of variable mean amplitude, a rectifier having output terminals, means for impressing said high frequency current on said rectifier, a resistor having a non-linear direct current-voltage characteristic, a second resistor having a substantially linear direct current-voltage characteristic, means connecting said resistances in a series circuit, means connecting said series connection across the output terminals of said rectifier whereby rectified energy flows in said resistances and voltages are produced across said resistances by said direct current flowing therein, and an alternating current measuring instrument coupled in shunt to one of said resistances.

2. A system as recited in claim 1 wherein said non-linear resistance is of the dioxide of uranium type.

3. A system as recited in claim 1 wherein said non-linear resistance is of the iron hydrogen type.

4. In a modulation meter adapted to indicate the degree of modulation of carrier waves of different amplitude, a rectifier having input and output electrodes, an alternating current circuit which may be energized by modulated wave energy coupled to said input electrodes, an impedance having a substantially constant voltage-ampere characteristic and an impedance having a non-linear voltage-ampere characteristic coupled to the output electrodes of said rectifier, and indicating means connected with one of said impedances.

5. A meter as recited in claim 4 wherein said impedance having the non-linear voltage-ampere characteristic is of the constant current type.

6. A meter as recited in claim 4 wherein said impedance having the non-linear voltage-ampere characteristic is of the constant voltage type.

7. In a modulation meter adapted to indicate degree of modulation of carrier waves of different amplitude, a rectifier having input and output electrodes, an alternating current circuit which may be energized by modulated wave energy coupled to said input electrodes, a substantially linear and a non-linear impedance coupled to the output electrodes of said rectifier, said linear impedance having a linear direct current-voltage characteristic, said non-linear impedance having a constant direct current-variable voltage characteristic, and indicating means connected in shunt to said substantially linear impedance.

8. In a modulation meter adapted to indicate the degree of modulation of carrier waves of different amplitude, a rectifier having input and output electrodes, an alternating current circuit which may be energized by modulated wave energy coupled to said input electrodes, a substantially linear and a non-linear impedance coupled to the output electrodes of said rectifier, said linear impedance having a linear current-voltage characteristic, said non-linear impedance being of the constant voltage variable current type, and indicating means connected in shunt to said non-linear impedance.

WERNER BUSCHBECK.